Sept. 14, 1965  J. A. TURGEON  3,206,233
ROLLED GROOVE FOR ISOLATED PHASE BUS HOUSING GASKET
Filed May 4, 1961  3 Sheets-Sheet 2

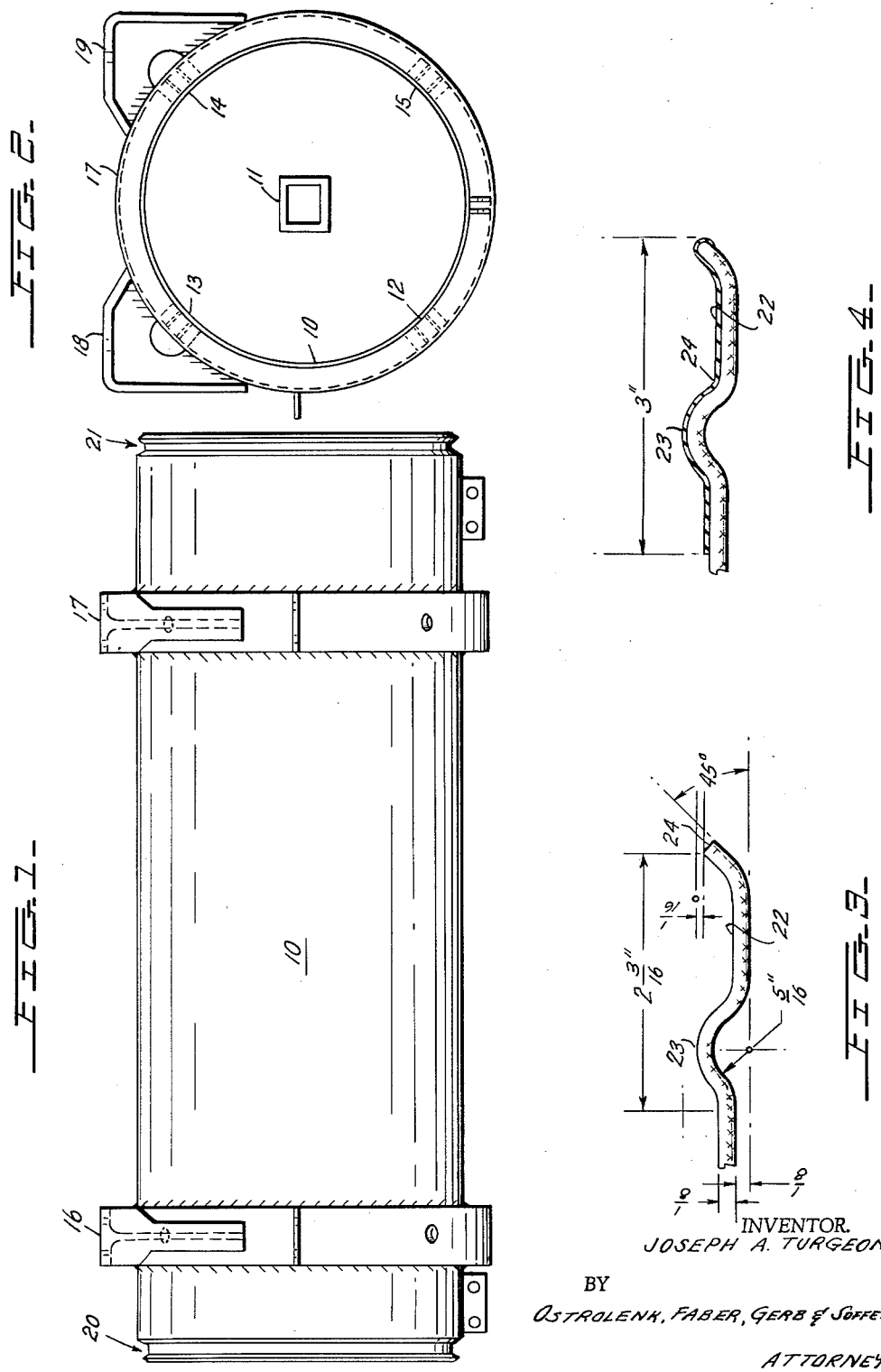

INVENTOR.
JOSEPH A. TURGEON
BY
OSTROLENK, FABER, GERB & SOFFEN
ATTORNEYS.

Sept. 14, 1965     J. A. TURGEON     3,206,233
ROLLED GROOVE FOR ISOLATED PHASE BUS HOUSING GASKET
Filed May 4, 1961     3 Sheets-Sheet 3
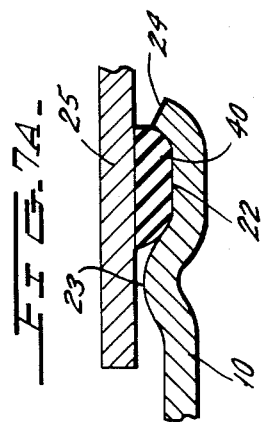
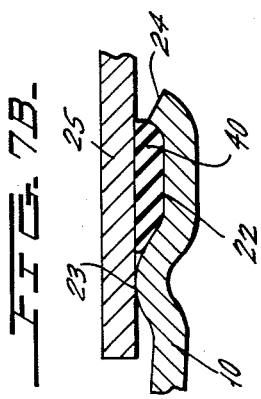
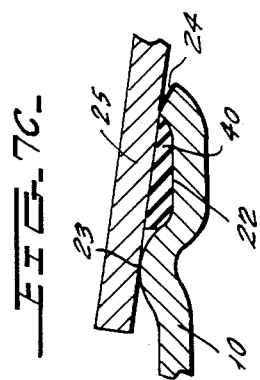
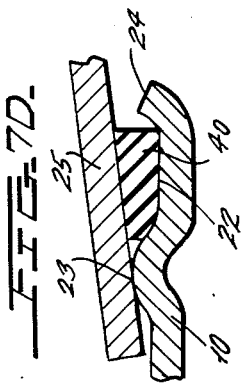
INVENTOR.
JOSEPH A. TURGEON
BY
OSTROLENK, FABER, GERB & SOFFEN
ATTORNEYS United States Patent Office 3,206,233
Patented Sept. 14, 1965

3,206,233
ROLLED GROOVE FOR ISOLATED PHASE
BUS HOUSING GASKET
Joseph A. Turgeon, Toronto, Ontario, Canada, assignor to
I-T-E Circuit Breaker (Canada) Ltd., Port Credit, Ontario, Canada, a limited-liability company of Canada
Filed May 4, 1961, Ser. No. 107,677
1 Claim. (Cl. 285—233)

This invention relates to a novel groove construction for the end of an isolated phase bus housing, and more specifically relates to an isolated phase bus housing construction which permits covers which span between two adjacent isolated phase bus housings to be connected to the housings to form water-tight joints, although there is misalignment between the bus housings.

Isolated phase bus systems are well known where a bus conductor is surrounded by a metallic housing. The bus housings are made in sections of predetermined lengths which are joined together, and for purposes of inspection, predetermined lengths of the bus housing are formed of clamp-on covers which can be removed to expose the bus and its insulators which support the bus with respect to the housing.

Since the housing must be water-tight, an efficient gasketed joint between the clamp-on covers and the bus housing portions is necessary. It has, however, been found that due to necessary tolerances used during manufacture of the housing, the adjacent ends of bus housing sections which are to receive a cover may be misaligned with respect to one another by a sufficiently large amount that would prevent the clamp-on covers from forming the required water-tight seal.

The principle of the present invention is to provide a novel rolled groove in the ends of the bus housings which receives a gasket member whereby the groove is constructed in such a manner that the clamp-on covers will form an effective water-tight seal to the housings, even though there is a substantial misalignment between the ends of the adjacent housings sealed by the covers. More specifically, a rolled section includes an annular groove which receives the gasket and terminates with an upwardly extending lip which has a smaller radius than does the outer portion of the groove. Accordingly, when clamp-on covers are placed on the end of such a groove, they engage the rolled groove only at its higher portions which are removed from the end of the bus when they are in their fully clamped position. The gasket however, is interposed between the end of the bus and this raised bead portion and within a rolled groove extending from the raised bead and misalignment is permissible, since the end of the bus is on a smaller radius than is the raised bead. The bus covers may then be applied to form an effective water-tight joint, even though the axes of the adjacent housing portions which are to receive the covers are misaligned with respect to one another.

Accordingly, a primary object of this invention is to provide a novel rolled groove in the end of an isolated phase bus housing for receiving a gasket.

Another object of this invention is to provide a raised bead around the end of an isolated phase bus housing which is in front of a gasket-receiving portion and which bead receives the covers and permits misalignment between the axis of the cylinder defined by the cover and the axis of the bus having the bead thereon.

Another object of this invention is to provide a novel clamping arrangement for isolated phase bus housings.

A further object of this invention is to provide a clamping arrangement for the covers of an isolated phase bus housing which permits some hinge action between the cover and the housing.

These and other objects of this invention will become apparent from the following description when taken in connection with the drawings, in which:

FIGURE 1 illustrates a length of isolated phase bus housing having the novel rolled groove of the invention at either of its ends.

FIGURE 2 is a side view of the housing of FIGURE 1.

FIGURE 3 is a detailed cross-sectional view through the rolled groove at one end of the housing of FIGURE 1.

FIGURE 4 shows the view of FIGURE 3, and additionally illustrates a layer of insulation placed on the outer grooved surface.

FIGURE 7A is an enlarged cross-sectional view which illustrates the manner in which the end of the cover of FIGURE 5 is received by the novel rolled groove of the invention, and shows the annular gasket in the non-compressed construction.

Figure 6:
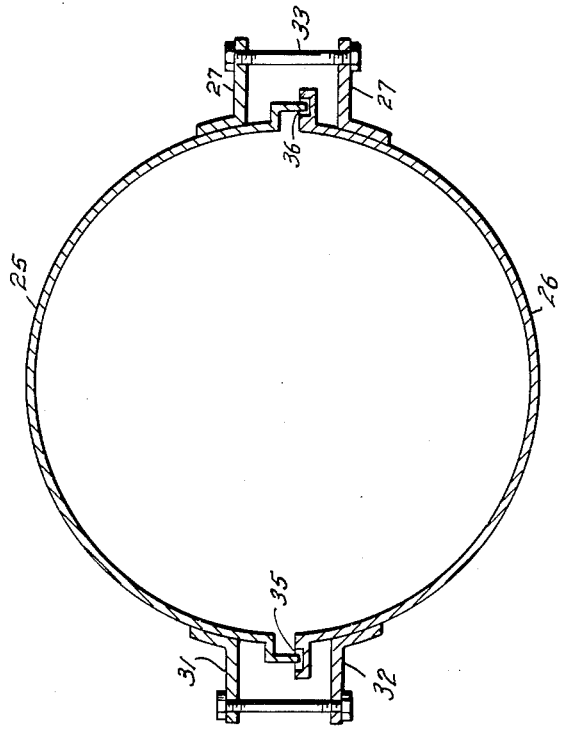
FIGURE 6 is a side cross-sectional view through the covers of FIGURE 5 taken across the lines 6—6 of FIGURE 5.

FIG. 7B corresponds to FIG. 7A, but shows the annular gasket compressed, with the bus cover in an aligned condition.

FIGS. 7C and 7D similarly show the gasket compressed, but under conditions of bus cover misalignment.

Referring first to FIGURES 1 and 2, I have illustrated a housing section 10 which is to enclose a bus such as the bus 11 of FIGURE 2 which extends centrally of the housing. As is usual in the prior art, the bus 11 will be supported from the housing 10 by insulator means (not shown) which are secured at locations 12, 13, 14 and 15 of bus support rings 16 and 17 which are welded to housing 10. The bus support rings 16 and 17 are further provided with mounting brackets 18 and 19, as shown in FIGURE 2 for supporting the bus from some support structure in the usual manner.

In accordance with the present invention, the ends 20 and 21 of housing 10 are provided with a rolled groove for permitting connection to a cover member in a manner to define a water-tight joint. The bus housing 10 can, for example, have a length of the order of 10 feet, and a diameter of 20 inches. When housing portions similar to housing portion 10 are mounted to a support structure it is understandable that the axes of the various adjacent housings may be misaligned. However, the cover arrangement which connects the two adjacent housings must still form a water-tight seal, even though the axis of the cover will be at an angle to the axis of the adjacent housings.

In accordance with the present invention, the end portions 20 and 21 are formed to a cross-section shown in FIGURE 3 by rolling to define an annular groove portion 22 which is positioned between a raised bead section 23 and a raised tip section 24. For purposes of illustration, the various dimensions of a typical end section are shown in FIGURE 3, it being important to note that the bead portion 23 has a radius which is 1/16 of an inch greater than the radius of tip 24. The groove of FIGURE 3 is rolled into the housing ends of the housing of FIGURE 1 after the housing is formed, and thereafter the rolled groove portion is covered with an insulating layer 44 which could be a tape or a layer of insulating paint so that the cover to be ultimately connected to this portion will be electrically insulated from housing 10.

Figure 5:
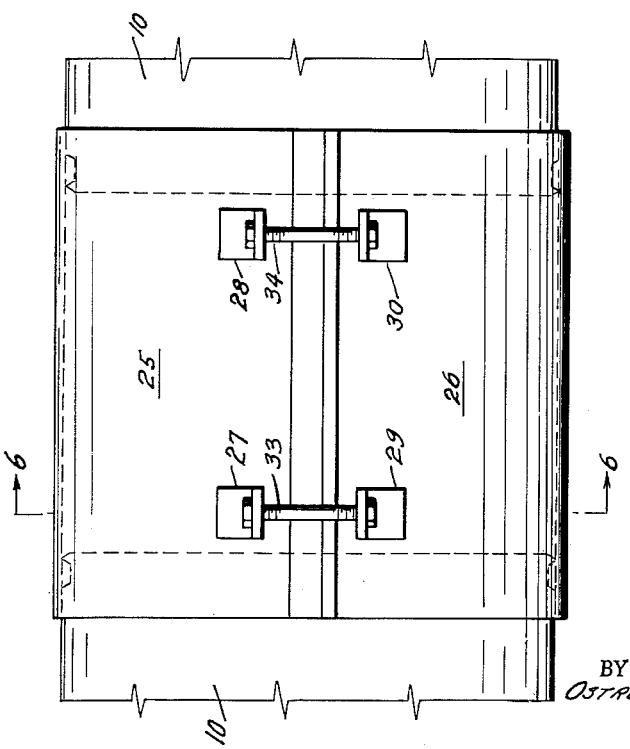
FIGURE 5 is a side plan view of the adjacent ends of two spaced housings of the type of FIGURE 1 with a clamp-on cover connected to enclose the space defined by the adjacent bus housings.

Referring now to FIGURES 5 and 6, I have illustrated two housing portions 10 which are positioned in spaced relationship with respect to one another, and are to receive a clamp-on cover. Thus, in FIGURE 5, a clamp-on cover comprised of cover halves 25 and 26 are to be clamped over the adjacent ends of housing sections 10. While the clamping arrangement for clamping cover halves 25 and 26 together may be of any desired type, one typical example is specifically shown in FIGURES 5 and 6 where the covers are provided with extending angles such as angles 27 and 28 of cover half 25 and angles 29 and 30 of cover half 26. Similar pairs of ocver angles are provided on the other side of cover halves 25 and 26, and are shown in FIGURE 6 for the case of angles 31 and 32 of cover halves 25 and 26 respectively.

The extending angles then receive bolt means shown as bolt means 33 and 34 in FIGURES 5 and 6 which operate to draw the covers toward one another. An axial gasket means is provided by forming an extending flange portion in cover half 26 which, as shown in FIGURE 6, has cork-type gaskets 35 and 36 therein which receive extending flanges of cover half 25, as shown. Thus, when cover halves 25 and 26 are assembled, a longitudinal seal is formed along the points at which the cover halves engage one another.

In accordance with the present invention, a water-tight seal is formed between the periphery of the cover formed of halves 25 and 26 and either end of housing portions 10. Thus, as is shown in FIGURE 7A, an annular gasket 40 is positioned within annular groove 22 which gasket is at least higher than the maximum height of bead 23. This gasket is compressed (FIG. 7B) when cover halves 25 and 26 are connected together, and by continuing to tighten cover halves 25 and 26 to one another, the inner surface of the ends of cover halves 25 and 26 will bear on the top surface of bead 23. Since the extending lip 24 at the end of housing 10 is below the level of bead 23, it will be apparent that the cover portions 25 and 26 can still be connected in sealing relationship to the end of cover 10, even though there is an axial misalignment between the cover and the housing (FIG. 7C and 7D).

The hinge action shown in the preferred embodiment of the invention will more specifically allow the clamp-on covers to move out of line by approximately three degrees in any direction. Thus, the novel clamp-on arrangement of the present invention provides flexibility in what would otherwise be a rigid assembly. This flexbility is of substantial advantage, since the clamp sections can now be misaligned with respect to the housing portions without interfering with the function of the gasket in providing the water-tight seal.

Although this invention has been described with respect to its preferred embodiments, it should be understood that many variations and modifications will now be obvious to those skilled in the art, and it is preferred, therefore, that the scope of this invention be limited not by the specific disclosure herein but only by the appended claim.

What is claimed is:

An isolated phase bus having a first and second cylindrical bus housing; each of said first and second cylindrical bus housing being adapted to have an end portion thereof enclosed by a cylindrical bus cover placed in overlapping relation with respect to said end portion of each said first and second cylindrical bus housings; said first and second cylindrical bus housings and said cylindrical bus cover being in general axial alignment with each other; said cylindrical bus cover being comprised of a first and second semi-cylindrical half cover; said end portion of each of said first and second cylindrical bus housings having a raised portion extending around its periphery; annular compressible gaskets; a said annular gasket being secured to each said end portion between the end of said cylindrical bus cover and said raised portion; said annular gaskets extending above said raised portions; clamping means on each of said cylindrical half covers, said clamping means securing said half section together and; said cylindrical bus cover to the periphery of said raised portions and compressing said annular gaskets; an annular groove in each of said end portions; said annular gaskets being positioned within said annular grooves; said annular grooves terminating in a raised lip portion at the end of said first and second cylindrical bus housings; said raised portions extending above said raised lip portions; said raised portions and said annular grooves being rolled in said first and second cylindrical bus housings; the inner surface of said cylindrical bus cover forcibly bearing against said raised portion while permitting a predetermined amount of clearance wth said lip portion; said predetermined amount of clearance allowing relative axial misalignment between said cylindrical bus cover and said bus housings, with said cylindrical bus cover having a range of pivoted motion with respect to said first and second cylindrical bus housings while maintaining said annular gaskets in a compressed condition; axial compressible gaskets; said axial gaskets positioned between said first and second semi-cylindrical half covers; said axial compressible gaskets and said annular compressible gaskets rendering said isolated phase bus water tight.

References Cited by the Examiner

UNITED STATES PATENTS

| | | | |
|---|---|---|---|
| 2,063,967 | 12/36 | Whittam | 285—349 |
| 2,367,191 | 1/45 | Bailey et al. | 285—419 |
| 2,395,745 | 2/46 | King | 285—233 X |
| 2,442,034 | 5/48 | Busch | 285—231 |
| 2,779,498 | 1/57 | Cole et al. | 285—158 |
| 2,913,262 | 11/59 | Cenzo | 285—233 X |
| 3,094,343 | 6/63 | Wood | 285—234 X |

CARL W. TOMLIN, *Primary Examiner.*

EDWARD C. ALLEN, *Examiner.*